March 19, 1963    F. D. LAKINS    3,081,522
CONTROL SYSTEM FOR STOCK BAR FEEDS
Filed April 3, 1958

INVENTOR.
FRANKLIN D. LAKINS
BY *D. Emmett Thompson*
   *Attorney*

United States Patent Office 3,081,522
Patented Mar. 19, 1963

3,081,522
CONTROL SYSTEM FOR STOCK BAR FEEDS
Franklin D. Lakins, Nedrow, N.Y., assignor to Lipe-Rollway Corporation, Syracuse, N.Y., a corporation of New York
Filed Apr. 3, 1958, Ser. No. 726,241
1 Claim. (Cl. 29—37)

This invention has to do with automatic stock bar feeds used in connection with automatic bar working machines and more particularly with a control system for such bar feeds for controlling the closing of the spindle collet upon the initial advancement of a new or fresh stock bar. Such machines have a rotatable hollow spindle with a bar gripping collet mounted in the nose of the spindle for effecting rotation of the stock bar during the formation of parts from the bar by tooling automatically operated by the machine. The stock bar feed includes an elongated guide tube for receiving a stock bar, which is usually several feet in length, the bar being advanced through the guide tube into the spindle of the machine by a power operated plunger, or pusher.

A bar stop, referred to as a facing stop, is provided on the machine and is moved into axial alignment with the spindle to form a stop for the advancement of a new bar being fed, so as to accurately position the end of the bar for the facing operation. When the stock bar is exhausted, the collet is opened by disengaging a main cam shaft clutch on the machine. The pusher is returned to the rear end of the guide tube to permit the insertion of a new bar in the guide tube in front of the pusher. As soon as the new bar has been inserted in the guide tube, the pusher moves forwardly to advance the forward end of the bar through the spindle and collet against the facing stop. The clutch is then engaged to close the collet and cycle the tooling to form the work piece. An arrangement of that type, wherein the various operations of the bar feed and the operation of the main cam shaft clutch are effected by fluid operated piston and cylinder structures, is disclosed in Patent No. 2,595,522, to Bernard C. Harney.

The control system for the bar feed is adjusted so that the forwar dend of the stock bar will engage the facing stop before the engagement of the cam shaft clutch to effect closing of the collet. This adjustment, however, does not provide for the positioning of the forward end of the new stock bar against the facing stop if the bars vary in length. Stock bars often are widely random in length and, because of this, stock bars of short length do not advance for engagement with the facing stop before the closing of the collet. This may result in damage to the closed collet, or in not having the end of the bar properly faced off, and more particularly in the end of the bar not being faced at all, which will result in broken toolage upon the first cycle of the tooling operation.

Bar feed control systems now in use and such as disclosed in Patent No. 2,595,522, referred to, will not function to provide for the proper feeding of stock bars of random lenth. In such systems, the actuating mechanism for the main clutch is operated upon the initial advancement of the bar feeder. This actuating mechanism includes an air valve, switch, etc., located to be operated by the stock bar pusher and if this valve is located for actuation upon the advancement of a short bar, it will not be actuated at all when a long bar is positioned in the guide tube. On the other hand, if the valve is positioned rearwardly for actuation upon the initial advancement of a long bar, then, in that event, actuation when a short bar is being advanced will result in the short bar not reaching the facing stop before the collet is closed.

This invention has as an object a control system for automatic bar feeds which functions to assure advancement of a fresh stock bar into engagement with the facing stop prior to the closing of the spindle collet regardless of the length of the bars being fed.

The invention consists in the novel features and in the combinations and constructions hereinafter set forth and claimed.

In describing this invention, reference is had to the accompanying drawings in which like characters designate corresponding parts in all the views.

In the drawings—

Figure 1:
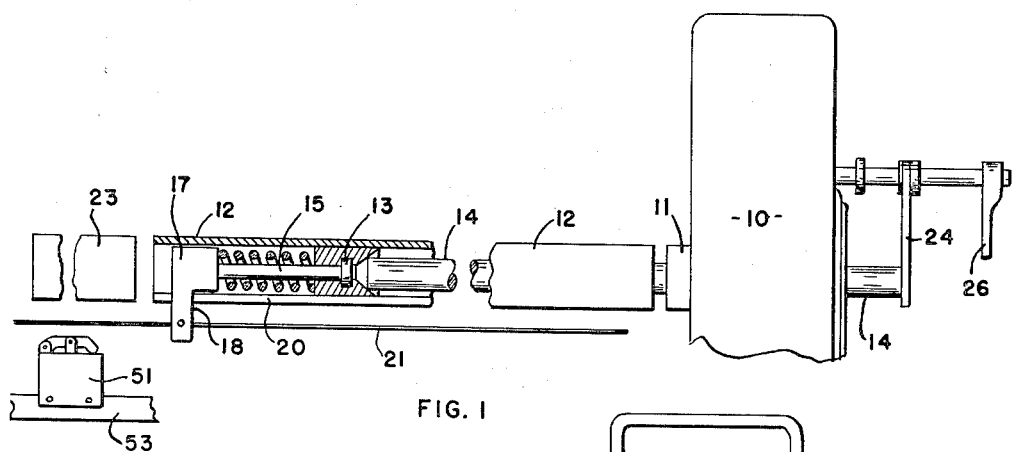
FIGURE 1 is a plan view, with parts in section and parts broken away, of the head stock of a bar working machine and the guide tube of the bar feed.

10 indicates generally the head stock housing of an automatic bar working machine in which is journalled a spindle 11, in the forward or nose end of which is the conventional bar gripping collet. 12 designates the stock bar guide tube of the bar feed in which there is slidably mounted a plunger or pusher 13 for advancing the stock bar 14 through the machine spindle 11. The pusher 13 is slidably mounted in the tube 12 and is mounted on the end of a stem 15 for rotatable and axial movement thereon, the stem extending forward from a member 17 having a portion 18 extending radially through a slot 20 formed in the tube 12. The extending portion 18 is connected to an actuating cable 21 by which the pusher is reciprocated in the guide tube. Initially, the pusher 13 is moved rearwardly into the breech section 23 of the guide tube, and a stock bar 14 is inserted in the guide tube. The pusher is then advanced forwardly to advance the stock bar to move the front end thereof through the spindle 11 and the gripping collet. This forward advancement being controlled by a facing stop 24 which, at that time, is moved into registration with the spindle. Thereupon, the collet is closed to grip the bar, causing the same to be rotated by and with the spindle 11, and the facing tool of the machine is moved in to face off the end of the bar. Thereupon, the collet is opened and the pusher advances the bar against a work stop 26, whereupon the collet is closed and the bar rotated for the formation of the work piece by the tooling of the machine. This procedure is repeated for the formation of each work piece. In fluid operated systems, the cable 21 is connected to a double acting piston and cylinder structure. When the stock bar has become exhausted, the main cam shaft clutch is disengaged and pressure is supplied to the opposite end of the feed cylinder to return the pusher into the breech section 23 of the guide tube.

Figure 2:
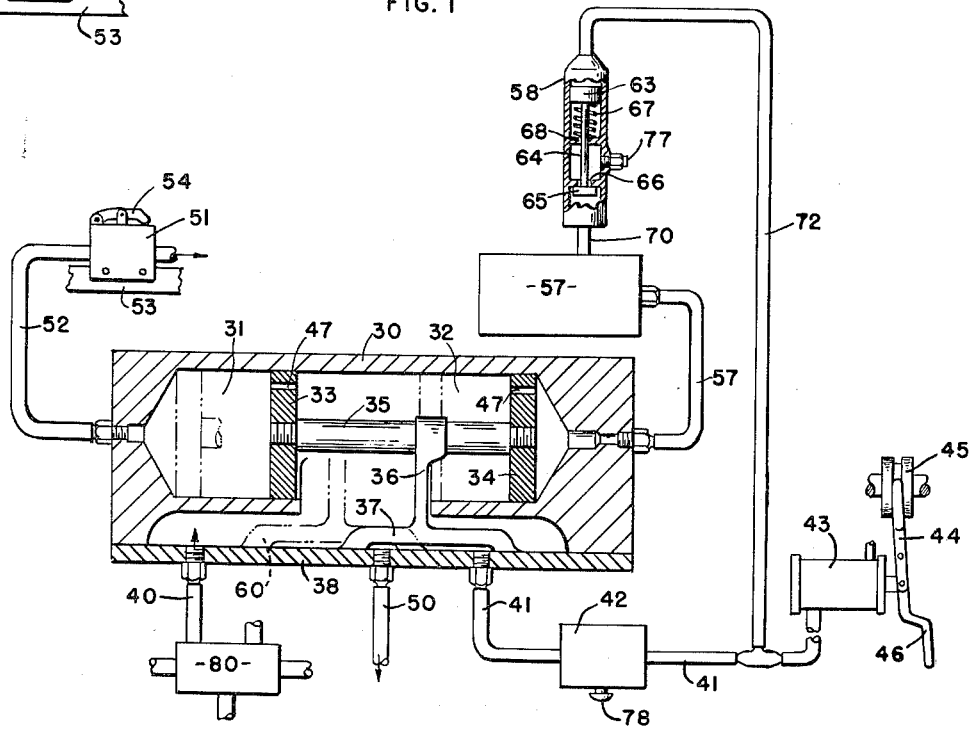
FIGURE 2 is a schematic diagram of the fluid control system including a lengthwise cross sectional view of the reversible control valve.

In my system, I provide a three port reversible control valve shown in FIGURE 2, which consists of a housing 30 formed at its ends with cylinders 31, 32, and in each of which there is mounted for reciprocation pistons 33, 34, respectively, these pistons being joined by a tie rod 35. An arm 36 is fixedly secured to the rod 35 and carries a slide valve 37 cooperable with a port plate 38. The plate 38 is formed with three ports, to one of which is connected a conduit 40 which is supplied with fluid under pressure through a master control valve 80 upon the return of the pusher 13 into the breech section 23 of the guide tube, this pressure being maintained by the valve 80 during the forward advancement of the pusher, the basic control system for the complete bar feed being disclosed in the Patent No. 2,595,522. The second port is connected to a feed line 41 having therein a flow control valve 42 and from which the line 41 extends to the main clutch cylinder 43. This cylinder is operatively connected to a yoke 44 for shifting the clutch collar 45.

The yoke 44 is provided with an operating handle 46 by which the machine operator may manually disengage the clutch in the event of a jam, or the like.

The pistons 33, 34 are formed with passages 47 extending therethrough, whereby the fluid pressure supplied by pipe 40 to the central portion of the valve housing bleeds therefrom into the closed end of each of the cylinders 31, 32. Normally, the slide valve is positioned, as shown in full line FIGURE 2, connecting the feed line 41 to an exhaust port having a discharge conduit 50.

The closed end of cylinder 31 is connected to a normally closed exhaust valve 51 through a conduit 52, this valve being mounted on a bar 53 extending parallel with the guide tube 12 and with the valve positioned so that the actuator 54 is engaged by the projection 18 of the pusher actuating mechanism.

The closed end of the cylinder 32 is connected by conduit 56 to an accumulator tank 57 which, in turn, is connected to a normally closed pressure operated exhaust valve 58. Accordingly, with fluid pressure supplied through pipe 40 to the valve housing between the pistons 33, 34, the fluid pressure bleeding through the passage 47 of piston 33 builds up more rapidly than in the closed end of the cylinder 32, due to the fact that the accumulator 57 provides for a greater displacement space than the conduit 52 connected to cylinder 31. This effects movement of the pistons to the right, as shown in FIGURE 2.

Upon initial movement of the stock pusher for the advancement of a fresh bar in the guide tube 12, the member 18 engages the actuator 54 momentarily opening the exhaust valve 51, relieving the pressure in the closed end of cylinder 31, permitting the built up pressure in the accumulator and the closed end of the cylinder 32 to move the piston assembly to the left, causing the slide valve 37 to assume the dotted line position, indicated at 60, FIGURE 2. This results in uncovering the outlet port to which the feed line 41 is connected, whereby fluid pressure is admitted to that line and conducted to the clutch cylinder 43 through the flow regulating valve 42. This effects a build up of sufficient pressure to operate the clutch yoke 44 to effect engagement of the collet closing chuck.

The pressure operated exhaust valve 58 is provided with a piston 63 having a stem 64, to the lower end of which there is affixed a valve disk 65 which is held in engagement with a valve seat 66 by a compression spring 67 positioned on the stem 64 and acting between the under side of the piston 63 and a partition 68 of the valve casing. The lower end of the valve 58 is connected by conduit 70 to the accumulator 57. The upper end of the valve is connected by a branch line 72 to the feed line 41. The arrangement is such that the build up in pressure in the branch line 72 is not sufficient to move the piston 63 downwardly against the action of spring 67 until after cylinder 43 and the piston therein have actuated the clutch yoke 44. However, in the meantime, the closed end of cylinder 31 has accumulated pressure through the bleed passage 47 of piston 33. Upon exhausting the accumulator 57 by the downward movement of valve disk 65 from the seat 66 connecting the accumulator 57 to the exhaust port 77, the pressure on piston 33 will cause the piston assembly to move to the right full line position, shown in FIGURE 2, whereby the reversible control valve is ready for the next cycle of operation.

The operation of the valve 58 not only exhausts the closed end of cylinder 32, but it also exhausts the cylinder 43, relieving the pressure therefrom so that the operator may disengage the clutch manually by the handle 46. As previously explained, the pressure remains on conduit 40 during the forward advancement of the pusher 13. The operation of the valve 51 by the member 18 is only momentary so that the repositioning of the control valve 30 prevents further application of pressure from the conduit 40 to the line 41, whereby during the operation of the machine for the consumption of the stock bar, the clutch may be at all times manually operated.

Initially the valve 51 is adjusted on the bar 53 to effect actuation of the valve by the member 18 upon initial forward movement of the pusher with a long length stock bar 14 in the guide tube. Then the control valve 42 is adjusted by manipulation of the screw 78 to regulate the flow in line 41 so that the clutch collar 45 will be actuated after the shortest length bar has been advanced into engagement with the facing stop 24. Thereafter, the control system operates to effect actuation of the clutch collar 45 after the stock bar has engaged the facing stop regardless of the length of the bars being fed. Accordingly, the system will properly effect the feeding of all bars of intermediate length as well as the longest and shortest bar.

What I claim is:

A control system for stock bar feed for automatic stock bar working machines having a rotatable hollow spindle in and through which the stock bar is fed, a bar gripping collet in the spindle rotatable therewith, mechanism for opening and closing the collet including a power drive and a clutch having an engaging and throw-out movement to clutch and declutch said power drive to and from said mechanism, a fluid operated piston and cylinder structure for operating said clutch, a facing bar stop movable into alignment with said spindle to limit the initial advancement of a stock bar through the collet by said bar feed, said bar feed including a stock bar guide tube for receiving and guiding a stock bar through the machine spindle and collet, a feed plunger movable along said guide tube, power operated plunger actuating means to move said plunger forwardly to feed a stock bar through the machine spindle and collet into engagement with said stop and to move said plunger rearwardly to permit insertion of a new stock bar in said guide tube in front of the punger, the control system comprising a source of fluid under pressure, a reversible control valve connected to said source, a feed line extending from said control valve to said clutch operating cylinder, an exhaust valve mounted for actuation by said plunger actuating means upon the initial forward movement of the plunger, said control valve being operable upon actuation of said exhaust valve to connect said source to said feed line to effect operation of the clutch cylinder for engagement of said clutch, said feed line including means to vary the flow of fluid therein and having a branch line connected to a pressure operated exhaust valve, said pressure operated exhaust valve being operable upon the build up of a predetermined pressure in said line, subsequent to the operation of said clutch cylinder, to reverse said control valve to disconnect said source from said feed line and to connect said feed line to atmosphere.

References Cited in the file of this patent
UNITED STATES PATENTS

| | | |
|---|---|---|
| 2,527,458 | Schurr | Oct. 24, 1950 |
| 2,595,522 | Harney | May 6, 1952 |